United States Patent [19]

Baker, deceased et al.

[11] 4,074,153
[45] Feb. 14, 1978

[54] MAGNETIC PROPULSION DEVICE

[76] Inventors: Daniel Baker, deceased, late of New York, N.Y., by Esther Claire Fuhrer; Alan W. Borst, 60 E. 42nd St., New York, N.Y. 10017

[21] Appl. No.: 604,463

[22] Filed: Aug. 26, 1975

Related U.S. Application Data

[62] Division of Ser. No. 218,746, Jan. 18, 1972, abandoned.

[51] Int. Cl.$^2$ ............................................. H02H 41/00
[52] U.S. Cl. ...................................................... 310/12
[58] Field of Search ..................................... 310/12–19

*Primary Examiner*—Donovan F. Duggan

[57] ABSTRACT

A magnetic propulsion device which provides a magnetic field in which a permanently magnetized conveyor element is caused to have translatory motion as a unitary body. Operation of the device does not depend on induced magnetism in the moving element or in the production of the field which provides the propelling force for the element, such field being produced as by permanent magnets independently thereof. In several forms of the invention the permanent magnet element is suspended by repulsion forces and simultaneously propelled by attraction forces along a passage within the field. The magnetic elements producing the field are variously arranged to provide the propulsion as by lining the passage with magnetic strips of alternating polarity to produce repulsion and attraction forces of differing degree on the moving element or with magnetic members of a single polarity to produce a continuously increasing field of attraction for the element which is propelled thereby. In still another embodiment the permanent magnet element is mounted on a wheel which is turned as a result of the interaction of flux produced by the element and that produced independently thereof along an arcuate passage through which the element is propelled on the wheel as it is driven in rotation thereby. In whatever form the invention may take, which as presently contemplated may be manifold, it is to be noted that the moving element is in each case a permanently magnetized member, the physical nature of which affords the invention numerous applications in the useful arts, and the field providing its propulsion is primarily produced entirely independently thereof.

5 Claims, 8 Drawing Figures

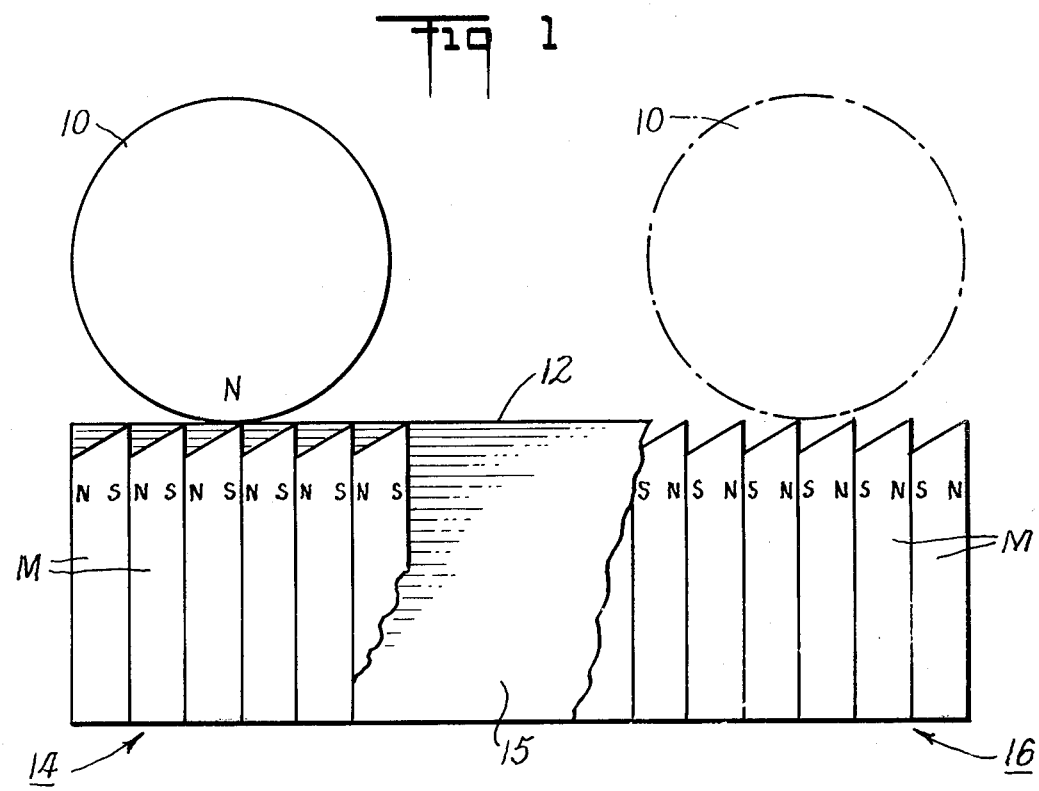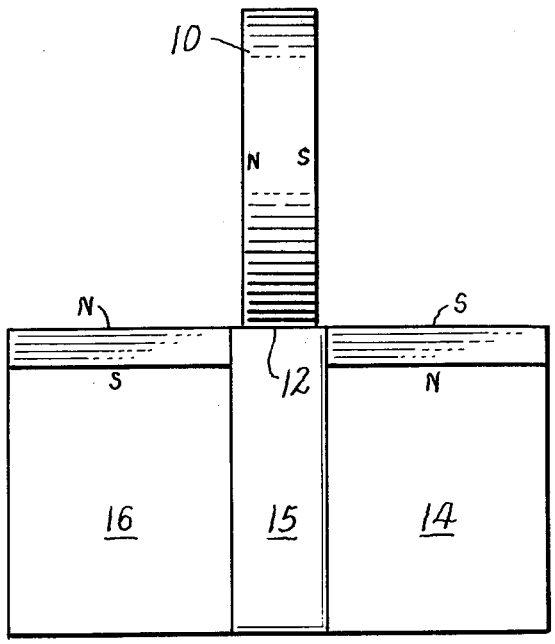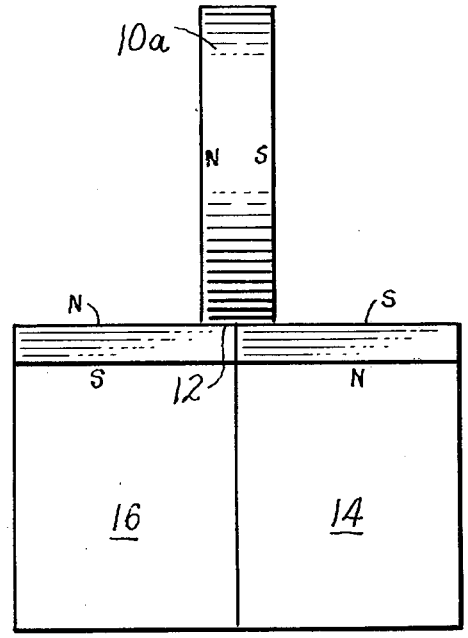

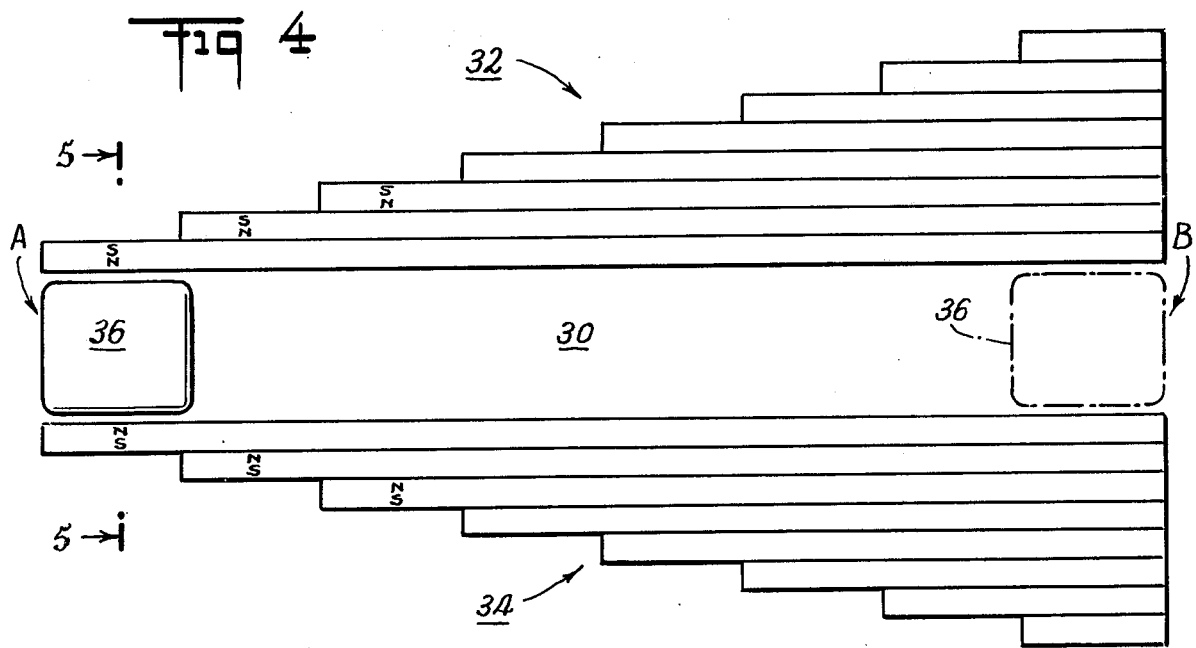
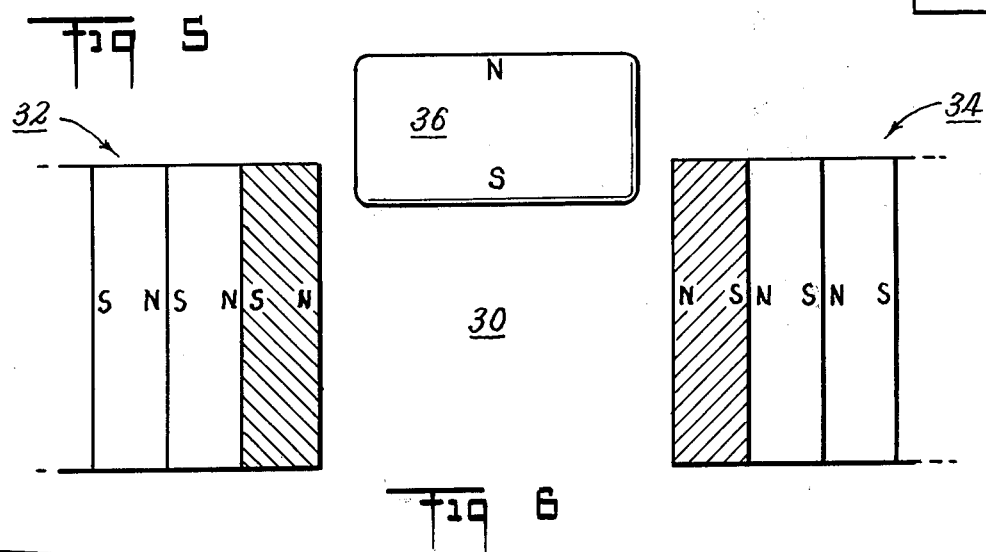
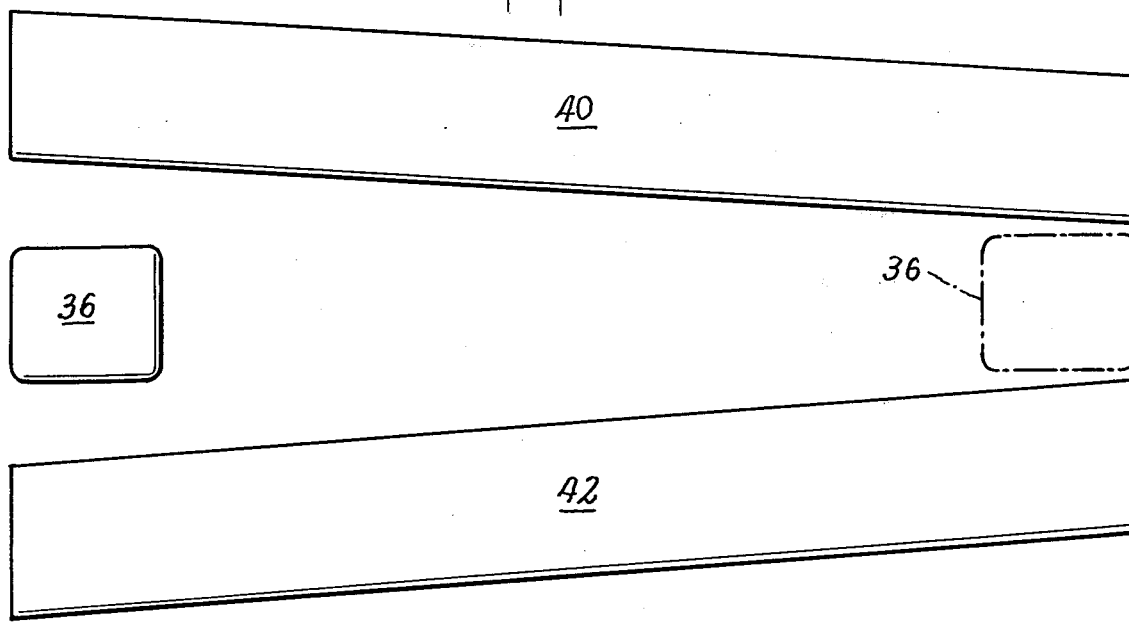

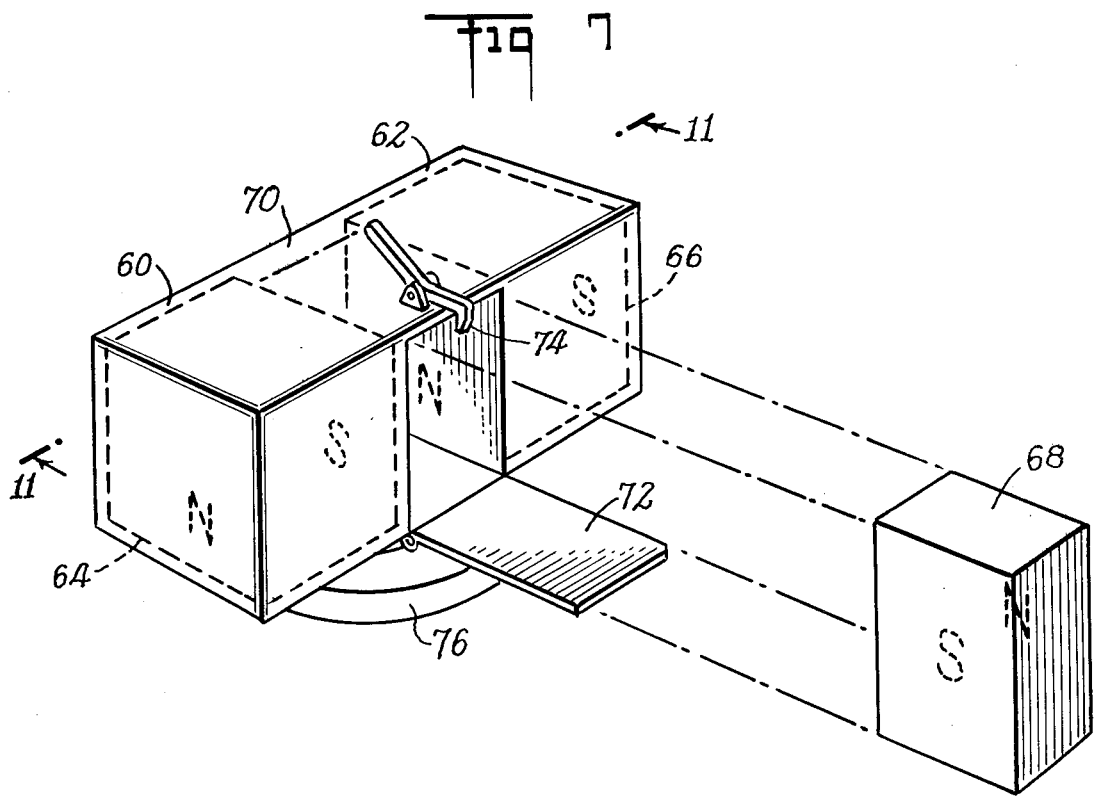
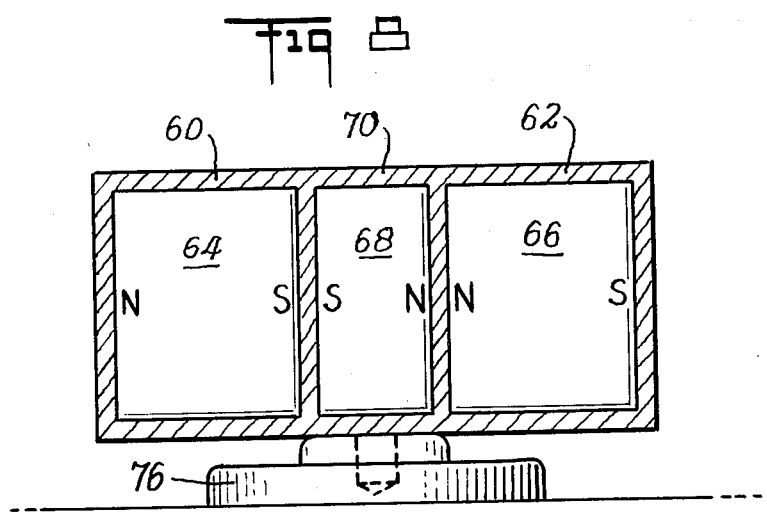

MAGNETIC PROPULSION DEVICE

This application is a division of application Ser. No. 218,746 filed 1/18/72, now abandoned.

The invention relates to self propelled devices and, in particular, to motors, magnetos and the like, the rotor element of which is moved due to the interaction of magnetic fields produced by the element itself and a stationary or rotating field produced by a dependent agency or a common source, the field being situated in sufficient proximity to the element to allow such interaction.

The present invention contemplates the employment of a moveable, permanent magnet disposed in a magnetic field produced by a collection of stationary, permanent magnets arranged in such a manner that the moveable magnet will move in a predictable manner either alone or as a driving force for a conveyor to which it is attached. The movement of the permanent magnet is bodily translatory as opposed to rotational on an axis of intersection therewith. The collection of arranged magnets is designated a propulsion wall. In one form of the invention the wall is arranged parallel to a passage or track for the moveable magnet which is propelled along the passage by magnetic forces of attraction which increase incrementally along the way as a consequence of the number of wall magnets being correspondingly increased. In another form of the invention the propulsion walls converge toward the end of the passage which causes the moveable magnet to encounter in its passage continuingly increasing lines of magnetic flux. It has been found that the moveable magnet can be freely suspended as well as propelled under proper conditions of polarity of the magnet relative to the wall.

In a still further form of the invention, the propulsion wall is composed of magnetic strips alternately presenting north and south poles to the passage for a magnetic conveyor. The wall is in this case located substantially underneath the passage, the strips providing the repelling force for the conveyor being arranged physically closer thereto than those which serve to magnetically attract the conveyor.

One object of the invention is to provide a device having a conveyor in the form of a permanent magnet adapted to be freely suspended and moved in a predictable manner from one point to another a substantial distance of which is within a magnetic field produced independently thereof.

Another object of the invention is to provide a device which produces independent magnetic fields of predetermined polarity and strength in juxtaposition to each other whereby a moveable member properly oriented in the field will move predictably as a conveyor or as a driving force for a conveyor on which it is borne.

Other objects and advantages of the invention will be appreciated on reading a more detailed description of several of its embodiments taken in conjunction with the accompanying drawings, in which:

FIG. 1 is a side elevation with parts broken away showing a magnetized track disposed between magnetic propulsion walls and a permanent magnet conveyor adapted to be propelled on the track by its interaction magnetically with said walls;

FIG. 2 is an end elevation as viewed from the left of FIG. 1;

FIG. 3 is similar to FIG. 2 without the magnetized track;

FIG. 4 is a top view of a modified conveyor and track arrangement;

FIG. 5 is a section taken on line 5—5 of FIG. 4;

FIG. 6 is another modification of a track arrangement;

FIGS. 7 and 8 are perspective and sectional views, respectively, showing a top projectile firing device.

Referring to the drawings, and more particularly to FIG. 1, a conveyor or projectile 10 in the form of a permanent magnet disc is disposed on track 12 located along the top of magnet 15 intermediate propulsion wall 14 on the right hand side and propulsion wall 16 on the left hand side thereof. As shown, the right side of the conveyor 10 is poled south and the left side north. Under the track 12, the right side of the magnet 15 is poled north and the left side south. Accordingly, the magnet 12 and conveyor 10 are in attraction which serves to maintain the conveyor on its track.

As shown in FIG. 1 the propulsion walls 14 and 16 are composed of magnets M joined face to face. Each magnet is magnetized through its thickness with one face north and its opposing face south. The magnets are disposed with their inside side edges directed toward the magnet 15, as seen in FIG. 2, and their top edges bevelled with the peaks reaching the level of the track 12, as shown in FIG. 1 and FIG. 2. The peaks of the magnets M are bevelled so that the top edges of the south polar faces are higher than the corresponding edges of the north polar faces. Thus, the peak edges of the right hand wall 14 closest to the track are poled to repel the conveyor the right side of which is similarly poled. The left hand wall 16 is also composed of top edge bevelled magnets in face to face contact and magnetized through their thickness, but their highest edges are formed on the north polarized face to provide a repelling force to the conveyor 10 whose left side is poled north. The propulsion of the conveyor riding on the walls 14 and 16 is guided continually along the top of magnet 15 by the alternating poles of the magnets on each side thereof.

As shown in FIG. 3, the propulsion walls 14 and 16 are disposed in edge to edge contact, the track 12 for the conveyor 10a being provided by the peaks of the individual magnets forming the propulsion walls.

There is shown in FIG. 4 to 6 two embodiments of an air-borne conveyor device. In one device, as shown in plan in FIG. 4 space track 30 is bounded by magnetic propulsion walls 32 and 34 each of which becomes progressively and incrementally thicker from the beginning of the track at A to the end B. As shown in FIG. 5, the conveyor 36 is a permanent magnet piece which is magnetized through its thickness, the lower face being poled south. The faces of the propulsion walls aligning the air passage are polarized north. The upper face of the conveyor 36 is polarized north. The conveyor is propelled due to the larger magnetic attractive forces ahead of it in its passage and is suspended in space within the passage due to a balance of counter acting forces due to its own weight and the repulsion magnetic force provided by the propulsion walls and its upper face both of which are poled north as shown in FIG. 5.

A modified wall structure for the propulsion walls is shown in FIG. 6. The modified walls 40 and 42 are converging members and of uniform thickness from start to finish. The magnetic forces of attraction ahead of the conveyor 36 in its air-borne track is progressively but in this case continuously stronger. In both embodiments the conveyer is propelled through space without support other than from the magnetic forces present.

Another embodiment of the invention shown herein is illustrated in FIG. 7. The permanent magnet conveyors 50 are shown supported on a wheel 52 near its periphery on each side. The wheel is rotatable on a shaft 54 journalled in walls 56 and 57 made of magnetically neutral material. Inserted in each wall are arcuately formed magnetic walls 58 stationed approximately 60° apart and having an arcuate length measured along a circle projected on the walls from the periphery of the wheel of approximately 60°.

The faces of the magnets 58 are poled north. The conveyors 50 are shown six in number and are secured to each side of the wheel 52 with their south polar regions adapted to pass between the magnetic walls 58, their north poles passing above the walls. As shown in FIG. 8 and FIG. 9 the opposing polarized faces of the magnetic walls are converging to provide continuously stronger magnetic forces of attraction for the magnet conveyors 50 in each of the arcuately configured magnetic passages. The wheel is thus turned as the magnetic forces of attraction acting on the conveyors 50 provides the propulsion torque. The relative distances between the conveyors is not critical except that it is preferred to have one magnet entering the arcuate passage between the wall magnets as another is leaving which in this manner serves at least partially to overcome the inhibitive influence of the walls which the conveyors encounter at the end of each passage.

As shown in FIGS. 10 and 11, housings 60 and 62 are provided to permanently contain magnets 64 and 66 respectively in a projectile firing device. A magnetic projectile 68 having its magnetized sides poled with respect to the magnets 64 and 66 for forward propulsion by means of magnetic repulsion is loaded for firing in chamber 70 which is disposed intermediate the housings. The chamber 70 has a hinged gate 72 closing the chamber and capable of being opened by latch 74 to permit the escape of the projectile 68. The projectile may be fabricated of a rubberized magnetic material. Magnetic areas on the projectile are facing areas of the same polarity on the magnets 64 and 66 as shown in FIG. 10 to provide the desired magnetic repulsion forces. The assembly is supported on a swivel base 76 to permit aiming the projectile and to that end the latch 74 may serve as a sight or bead to aid in directing or aiming the projectile.

It has been found that in order for the projectile 68 in firing position within the chamber 70, its rear edge must be a slight distance forward of the corresponding edges of the magnets 64 and 66 as shown by the dot-dash line indicating such edge in FIG. 10. If these edges are flush, or nearly so, the firing function is inhibited.

Various other embodiments of the invention may be effected by persons skilled in the art without departing from the scope and principle of the invention as defined in the appended claims.

What is claimed is:

1. A magnetic propulsion device comprising a magnetized propulsion wall composed of a plurality of individual magnets extending continuously from the beginning to the end thereof, each magnet being permanently magnetized through its thickness, a second propulsion wall spaced from said first wall having the same length, linear or radial arcuate, as said first wall and transversely substantially the same beginning and end terminal points, whereby the space defined by said propulsion walls is adapted to receive a magnetized element which is propelled therethrough from the beginning to the end thereof due to the interaction of the magnetic fields produced by said element and said walls.

2. A magnetic propulsion device as defined in claim 1 wherein said propulsion walls are arcuate in configuration.

3. A magnetic propulsion device as defined in claim 1 wherein said propulsion walls converge from the beginning to the end thereof.

4. A magnetic propulsion device as defined in claim 1 wherein said walls have parallel opposing sides, each wall expanding in width from the beginning to the end thereof.

5. A magnetic propulsion device as defined in claim 1 wherein a track member magnetized through its thickness is inserted in the space defined by said propulsion walls.

* * * * *